United States Patent [19]
Mathews

[11] Patent Number: 5,324,442
[45] Date of Patent: Jun. 28, 1994

[54] FERMENTATION PROCESS FOR THE PRODUCTION OF CALCIUM MAGNESIUM ROAD DEICER

[75] Inventor: Alexander P. Mathews, Manhattan, Kans.

[73] Assignee: Kansas State University Research Foundation, Manhattan, Kans.

[21] Appl. No.: 897,983

[22] Filed: Jun. 16, 1992

[51] Int. Cl.$^5$ ............................................. C09K 3/18
[52] U.S. Cl. .................................... 252/70; 427/220; 428/403
[58] Field of Search .......................... 252/70; 428/403; 427/220

[56] References Cited
U.S. PATENT DOCUMENTS 4,855,071 9/1989 Todd, Jr. et al. ...................... 252/70

Primary Examiner—Christine Skane
Assistant Examiner—Necholus Ogden
Attorney, Agent, or Firm—Hovey, Williams, Timmons & Collins

[57] ABSTRACT

A relatively low cost double salt road deicer composition is provided which includes a preponderant quantity of calcium magnesium propionate (CMP), together with smaller quantities of calcium magnesium acetate (CMA) and related salts. The product is preferably made by inoculating a sugar substrate (e.g., glucose, xylose or the hydrolysis products of biomass or starch) with facultative bacteria, followed by fermentation under anoxic conditions at moderate temperatures (30°-37° C.) and pH (5-7) in order to yield an organic acid mixture; the mixture is then reacted with a source of magnesium and calcium cations such as dolomite to produce mixed salts, which are then recovered as a solid road deicer. The preferred inoculum is *P. acidi-propionici*, and the fermentation step can be carried out batch-wise or continuously.

4 Claims, 6 Drawing Sheets

FERMENTATION PROCESS FOR THE PRODUCTION OF CALCIUM MAGNESIUM ROAD DEICER

BACKGROUND OF THE INVENTION

1. Field of the Invention

The present invention is broadly concerned with a novel road deicer composition which is significantly more effective than salt while being substantially less expensive than other non-salt substitute deicers such as calcium magnesium acetate. More particularly, the invention pertains to a novel road deicer in the form of a solid particulate and including in preponderant amount calcium magnesium propionate; the deicer composition is preferably obtained by the fermentation of sugars with *P. acidi-propionici* to yield a mixture of organic acids (predominantly propionic acid) which is thereafter reacted with a source of calcium and magnesium cations such as dolomite.

2. Description of the Prior Art

The importance of the effectiveness removal of snow and ice from roadways during winter can not be overemphasized in terms of reducing traffic accidents and fatalities. Approximately eight million metric tons of salts, principally sodium chloride and some calcium chloride, are used annually on roadways in the United States for this purpose. While these salts are inexpensive and effective deicers, there are numerous harmful effects attendant to their use. These include the accelerated corrosion of automobiles, degradation of structural and reinforcing steel, damage to roadside vegetation, and harm to drinking water supplies. Among the various alternative compounds heretofore proposed as substitute deicers, calcium magnesium acetate (CMA) has emerged as the leading candidate, based on its effectiveness in deicing and reducing corrosion rates and environmental effects. However, the cost of this product is approximately twenty times or more than that of rock salt. Therefore, the use of CMA by various local and state governmental agencies has been quite minimal owing to cost considerations.

CMA is produced by reacting dolomite with acetic acid. Dolomite is relatively inexpensive, and the major cost factor in the production of CMA is the cost of raw material, acetic acid. The large scale production of a deicer such as CMA from synthetic acetic acid is not economically feasible at present. The annual requirement of acetic acid would be above twice the annual production levels of this chemical, just to substitute 10% of the rock salt consumption with CMA.

The most economical route currently developed envisaged for the production of acetic acid is via the conversion of biomass-derived sugars by anaerobic fermentation using the obligate anaerobe *C. thermoaceticum*. However, anaerobic fermentation requires optimal operating temperatures of 55°-60° C., a pH of 7-8, and the maintenance of a completely oxygen-free reaction environment. These conditions necessitate the use of rather expensive equipment and procedures, and hence production costs are still relatively high. Furthermore, acid production using *C. thermoaceticum* is limited at sugar concentrations higher than about 2%. Thus, if a 10% sugar solution is used, only 2% is utilized for acid production. This not only limits the production of acid, but moreover means that a higher proportion of water must be removed to obtain a dry product, thus further increasing production costs.

SUMMARY OF THE INVENTION

The present invention overcomes the problems outlined above, and provides a novel road deicer product and method of preparing the same which is relatively low in cost, especially as compared with production costs of CMA, and wherein the product has enhanced road deicing characteristics.

The road deicer of the invention is used advantageously in dried particulate form and normally includes respective quantities of calcium magnesium propionate (CMP), calcium magnesium acetate (CMA) and calcium magnesium lactate (CML). In such a mixed salt composition, the CMP is the predominant species, i.e., it is present in an amount greater than the CMA or CML. In one particularly preferred form, the CMP is present at a level of from about 50-75% by weight, CMA is present at a level of from about 25-40% by weight and CML constitutes the balance of the salts. The dried product would be typically ground in the form of an amorphous powder, but it can be granulated or coated onto sand by spray drying to produce a sand and deicer mixture of desired size distribution.

The calcium magnesium propionate is a double salt whose precise structure including water of hydration is not known. Generally speaking, the CMP of the invention will have a molar ratio of calcium to magnesium therein of from about 0.1:1 to 1:0.1. Typical grades exhibit Ca:Mg molar ratios of 4:6 and 3:7.

Freezing point analyses of CMP versus CMA where the Ca:Mg molar ratios in the CMP were 4:6 and 3:7 indicate that CMP is more or less equally effective as CMA in depressing the freezing point of water. Hence, the quantity of the mixed deicer composition of the invention that needs to be used for specific applications would be virtually identical to the amount of CMA which would be required. However, since the heat of solution of propionic acid is higher than that of acetic acid, a more rapid melting of snow and ice will be accomplished using CMP.

In preparative procedures, a mixture of organic acids is first obtained, which is then reacted with a source of calcium and magnesium cations under controlled conditions. In order to obtain the starting acids, it is preferred to begin with a quantity of a sugar substrate, followed by inoculating the substrate with a facultative bacteria and fermentation of the inoculated substrate under anoxic conditions. The bacteria may be selected from the group consisting of *Propionibacterium* 9/9, e.g., *P. shermanii*, *Veillonella parvala*, *Veillonella alcalescens*, *Selenomonas ruminatium* (pH 5), *Selenomonas sputigena* (pH 5), *Clostridium* (5/78), e.g., *C. propionicum* (25° C.), *C. novyi* (45° C.), *Megasphaera elsdenii* (pH +8), *Bacteriodes spp.* (17/30), e.g., *B. fragilis*, *B. ruminicola*, and *F. necrophorum*. In preferred forms, the bacteria is *P. acidi-propionici*, and the fermentation is carried out such that the preponderant acid in the resultant acid mixture is propionic acid. Other typical acids present are acetic and lactic acids.

The sugar substrate is preferably selected from the group consisting of glucose, xylose and the hydrolysis products of cellulose-bearing materials (e.g., wood) and starches. In the latter instances, the hydrolysis reaction is carried out initially in order to obtain the sugar substrate, whereupon inoculation and anoxic fermentation are carried out.

The fermentation is typically conducted over a period of about 1–4 days, at a pH of from 5–7 and a temperature of from 30°–37° C. The final product is a mixture of acids in water, and generally includes an acid fraction comprising from about 50–75% by weight propionic acid, from about 25–40% by weight acetic acid, and with the balance being lactic acid. This acid fraction constitutes typically from about 2–7.5% by weight of the overall acid/water final product.

After the fermentation is completed and the dilute acid mixture is obtained, the road deicer product may be obtained by reacting the acid mixture with a source of calcium and magnesium cations to form the appropriate double salts of the acids. The cation source is preferably selected from the group consisting of limestone, calcium and magnesium hydroxides, calcium and magnesium oxides, dolime and dolomite, with dolomite being the most preferred reactant for reasons of cost. However, since the solubility of calcium carbonate or limestone is much lower than that of lime, for complete conversion, the dolomite addition may be followed by dolime addition as a second step.

Generally speaking, the final reaction the acids with dolomite or dolime is carried out for a period of from about 4–8 hours at room temperature. The reaction of dolomite with the acid is slightly exothermic and produces carbon dioxide gas. The reaction of dolime with the acid is highly exothermic and the temperature can reach the boiling point. Gentle agitation during the reaction period speeds the reaction when dolomite is used. The reaction may not go to completion during the specified reaction time. In this case, the excess acid may be neutralized with lime, dolime or sodium hydroxide. Once the reaction is complete, water is removed to yield the solid, dried deicer product. Any conventional water removal technique may be employed, such as heating under a vacuum.

The preferred method of producing the road deicers of the invention gives significant advantages, as compared with prior methods. The anoxic process of the invention operates optimally at temperatures of from about 30°–37° C. (as compared 55°–60° C. necessary for anaerobic fermentation using *C. thermoaceticum*); therefore, energy costs and evaporation losses are substantially reduced. In addition, when cell-recycling fermentation is used with a membrane reactor, the membrane filter and circulation loop must be maintained at the optimum reaction temperature. Hence, in preferred continuous fermentation even greater energy savings are realized.

In addition, pH is an important variable in the production of road deicer double salts, and this limits the solubility of the preferred cation source dolomite. At lower pH values, the solubility of dolomite was higher, and to be economical the reactor pH should be 6 or less. The optimum pH when using *C. thermoaceticum* is around 7, and productivity drops sharply below pH 6. When using *P. acidi-propionici*, however, optimum growth pH is 6. Therefore, operation at lower pH values results in lower recovery costs.

*C. thermoaceticum* is an obligate anaerobe, and will function only in the complete absence of oxygen with cell-recycling fermentation. The reactor and circulation loop must be completely devoid of oxygen. This represents a significant difficulty in practice, and increases capital costs. On the other hand, *P. acidi-propionici* is a facultative organism and will grow well even in the presence of some oxygen, thereby permitting the practice of lower cost anoxic fermentation.

Finally, the cell yield of the preferred *P. acidi-propionici* is about three times higher than that for *C. thermoaceticum*. The growth medium is also simpler and less costly, and will allow a variety of carbonaceous substrates to be used.

All of these factors contribute to the relatively low cost of the present deicer products, particularly in relation to prior CMA products.

DETAILED DESCRIPTION OF THE PREFERRED EMBODIMENT

Figure 1:
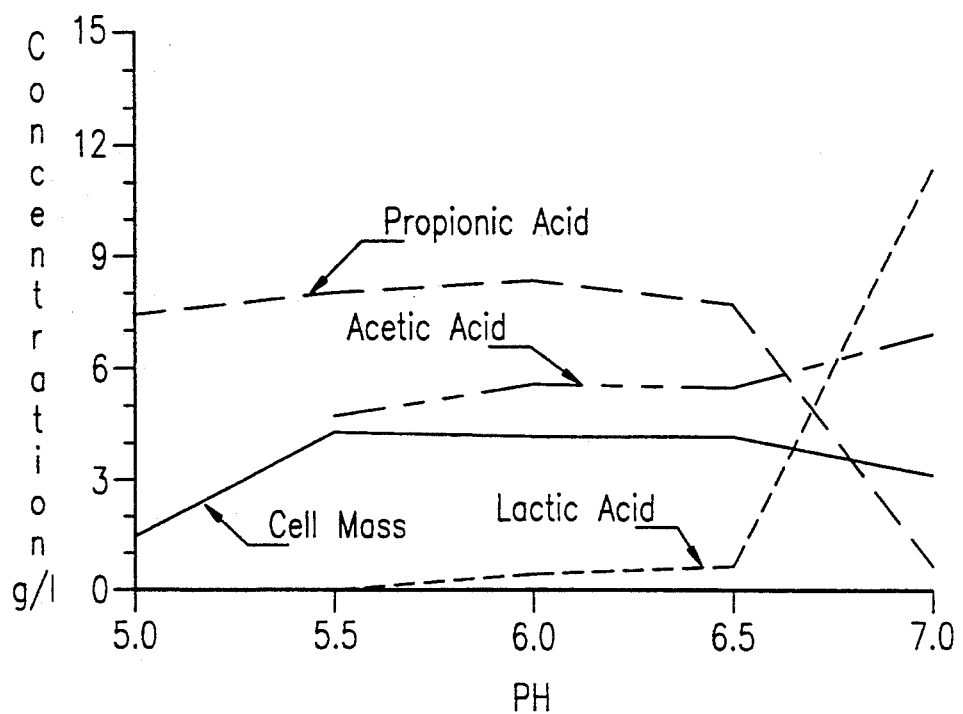
FIG. 1 is a graphic representation of data generated from a series of batch fermentation experiments of *P. acidi-propionici* at 30° C. and pH ranging from 5.0–7.0 using glucose as a sugar substrate.

The following examples set forth preferred procedures for the practice of the present invention. It is to be understood that these examples are presented by way of illustration and nothing therein should be taken as a limitation upon the overall scope of the invention.

EXAMPLE I

A series of batch fermentations was conducted to determine the influence of system pH and reaction times upon the organic acid and cell mass products from anoxic fermentations, wherein P. acidi-propionici acted upon a sugar substrate in a growth medium. The procedural steps broadly included preparation of the growth medium, inoculating the medium, monitoring and measuring fermentation results, maintaining a constant pH, and termination at culture maturity. pH values ranged between 5 and 7 in increments of about 0.5, and a good yield of propionic acid occurred as the majority acid product in all instances.

The first step in each test was preparation of a growth medium, as needed, including: one liter of distilled water, 25.0 g of trypticase pepton, 7.0 g of yeast extract, 0.5 g of potassium dihydrogen phosphate, 0.5 g of potassium hydrogen phosphate, 4.0 g of sodium carbonate, 20 g of glucose, and 0.5 g of cystein HCl. The trypticase, yeast extract, $KH_2PO_4$, $K_2HPO_4$ and 1 ml of 0.1% resazurin were first dissolved in the water under vigorous stirring, and the solution was boiled for 20 minutes. The solution was then cooled and carbon dioxide bubbled therethrough until the pH reached about 6.5; the resazurin pink color of the medium changed to yellow as oxygen was removed by $CO_2$ bubbling. $Na_2CO_3$, glucose and cystein HCl were then added and the solution was well mixed. Bubbling of $CO_2$ through the solution was continued until the pH reached about 7.5, and the medium was neutralized to pH 7 by the addition of 5N HCl. Next, the medium was autoclaved at 121° C. for 17 minutes and then cooled in a cold water bath to room temperature. The medium was stored in a rubber stoppered battle until use. Final sugar concentration was determined to be 19.1 g/l. In industrial production, several of the nutrients listed in the growth medium may be substituted with inexpensive materials that provide the same nutrients. For example steep water from corn processing and corn glutens can be substituted for yeast extract as a source of nitrogen and vitamins.

For each fermentation in the pH sensitivity analysis, 300 ml of the growth medium was placed in a one liter glass fermentation vessel under aseptic conditions. The vessel was also equipped with a magnetic stirrer (175 rpm), and temperature control of 30° C.±0.2° C. was maintained by an external heating source. Additionally, a pair of electrodes were placed within the medium, namely a conventional pH electrode (Ingold Electrodes, Inc., Wilmington, Mass.) and a dissolved oxygen electrode (Virtis Company, Inc., Gardiner, N.Y.). The pH electrode was operably coupled with a microprocessor pH controller for selectively controlling an actuatable pump permitting pH adjustment as necessary by the direct addition of 5N sodium hydroxide or hydrochloric acid. pH adjustment could also be made by manual addition of the base or acid. The dissolved $O_2$ electrode was coupled with a conventional indicator module.

Freeze-dried P. acidi-propionici bacteria (Accession No. 4875, American Type Culture Collection (ATCC), Rockville, Md.) in a double vial were rehydrated by the following procedure. The tip of the outer vial was heated in a flame and cracked with one or two drops of distilled water. The tip was broken by striking with a file and the insulator was removed. The inner vial was slowly removed from the outer vial, and the cotton plug was gently raised with forceps. A few drops of sterilized fresh medium described above was aseptically added to the freeze-dried culture with a pasteur pipette and mixed wall. The rehydrated bacteria which exhibited a pink color were kept in an aseptic condition for inoculation. (If bacterial grown on solid agar medium is used, it may be directly applied for inoculation without any pretreatment).

The rehydrated freeze-dried bacteria were inoculated into the liquid medium in a roll tube under a $CO_2$ environment. A V.P.I. Anaerobic Culture System (Bellco Biotech, Bellco Glass, Inc. Vineland, N.J.) was used to supply the gas to the roll tube. The cultures were inoculated twice before being used as an inoculum. Oxygen-free medium was placed in the roll tube (about 10 ml each) under the $CO_2$ environment. The tube was tightened with a rubber cap and autoclaved at 121° C. for 15 minutes. After the tubes were cooled, the first inoculation was performed under aseptic conditions. One hundred percent ethyl alcohol was used to disinfect the inoculation hood. The roll tube was placed in the V.P.I. system while $CO_2$ gas was supplied to the tube. Two drops of rehydrated bacteria were transferred to the tube by a pasteur pipette. The culture was incubated in a shaker at 30° C. for 48 hours. The second inoculation was accomplished by transferring the culture from the first inoculation, using the same methods and conditions described for the first inoculation.

After the dual inoculations, the bacteria were allowed to grow for another 48 hours in the shaker. The cultures were turbid with ropy sediment. The roll tube was then centrifuged at 2,000 rpm for 5 minutes using a TJ-6R table top centrifuge (Beckman Instruments, Inc., Palo Alto, Calif.) and the supernatant was discarded. About 4 ml of sterilized fresh medium were then added to the aggregated bacteria and mixed well. The cultures were now ready for a starting inoculum and were kept in a refrigerator (4° C.) for short term storage. The cultures under these conditions lasted about a month without any reduction in bacterial activity. Bacteria from these inoculum cultures were used to inoculate the medium within the fermentation vessel. A small single loop of bacteria was used in each case.

After inoculation of the 1 liter vessel, fermentation was initiated with temperature control and stirring until such time as the concentrations of fermentation products formed a plateau demonstrating a mature culture. Nitrogen was also continuously sparged into the vessel during the fermentation process, in order to keep the dissolved oxygen in the medium near zero, thereby promoting anoxic conditions.

FIG. 1 summarizes the results comparing the organic acid concentrations in cultures that were each matured as described above under different pH stabilized environments. These results confirm that propionic acid is produced in good yield as the preponderant organic acid for mature cultures at all pH values ranging between less than 5.0 and 6.5 but, at pH values somewhat above 6.5, the metabolic pathway for the production of propionic acid from lactic acid is inhibited.

Figure 2A:
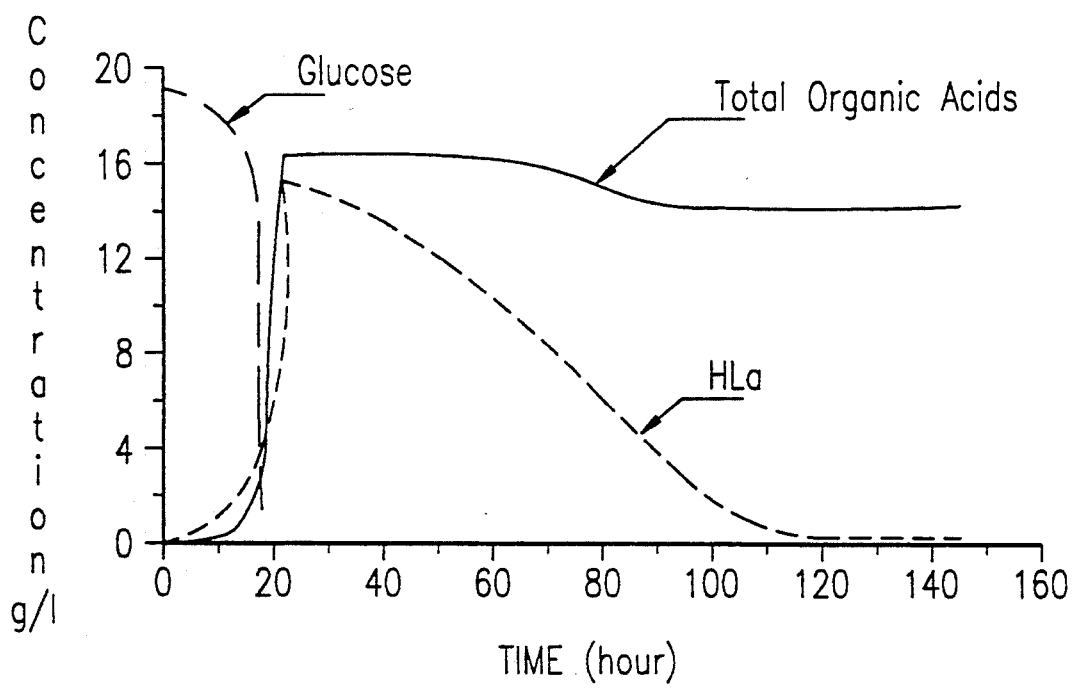
FIG. 2a is a graphical representation of total organic acid production, and glucose and lactic acid (HLa) consumption during the batch fermentation of *P. acidi-propionici* at 30° C. and pH 6 using glucose as a sugar substrate.
Figure 2B:
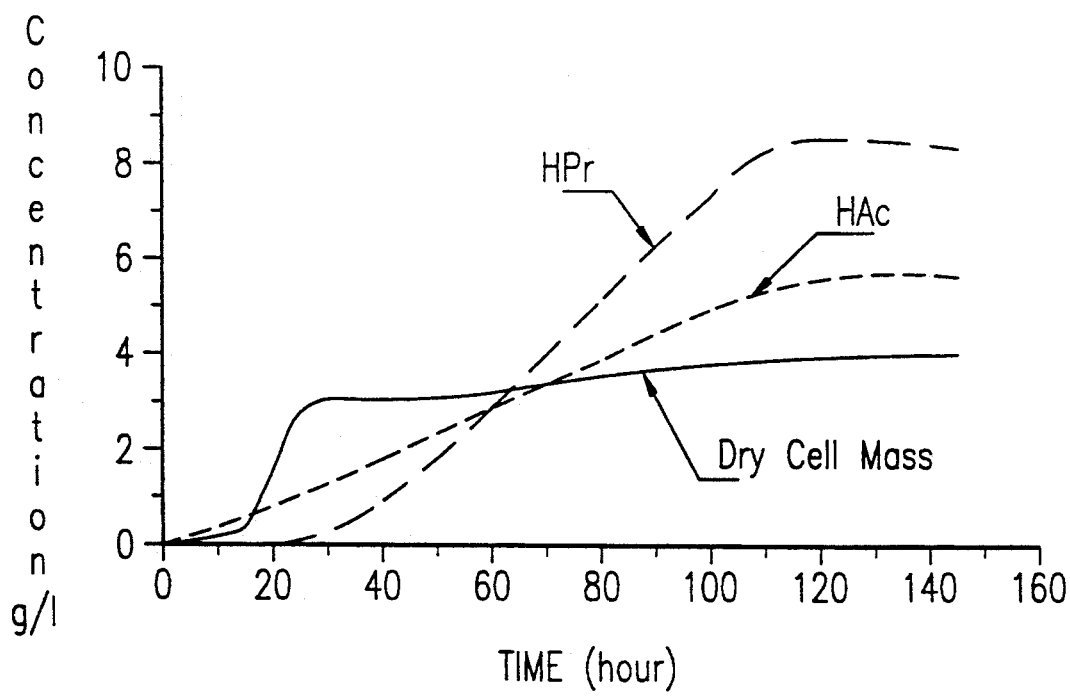
FIG. 2b is a graphical representation of cell mass production and propionic acid (HPr) and acetic acid (HAc) production during the batch fermentation of *P. acidi-propionici* at 30° C. and pH 6 using glucose as a sugar substrate.
Figure 4A:
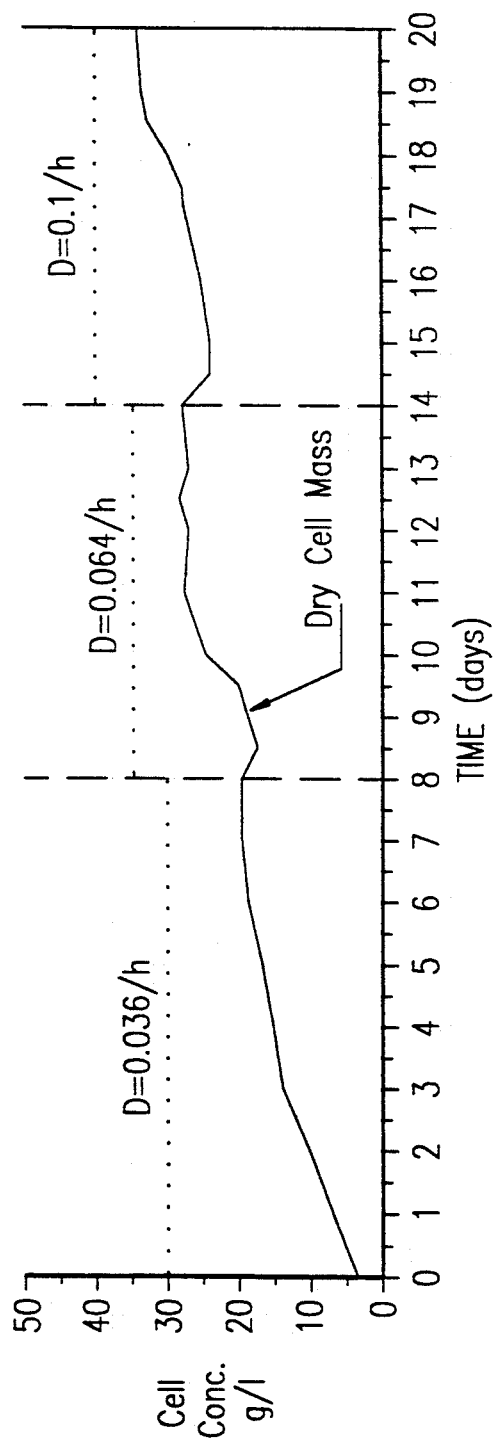
FIG. 4a is a graphical representation of cell mass production during continuous *P. acidi-propionici* fermentation with cell recycling using glucose as a sugar substrate, pH 5.5–6.3 and D (dilution ratio) of 0.036–0.1/h.
Figure 4B:
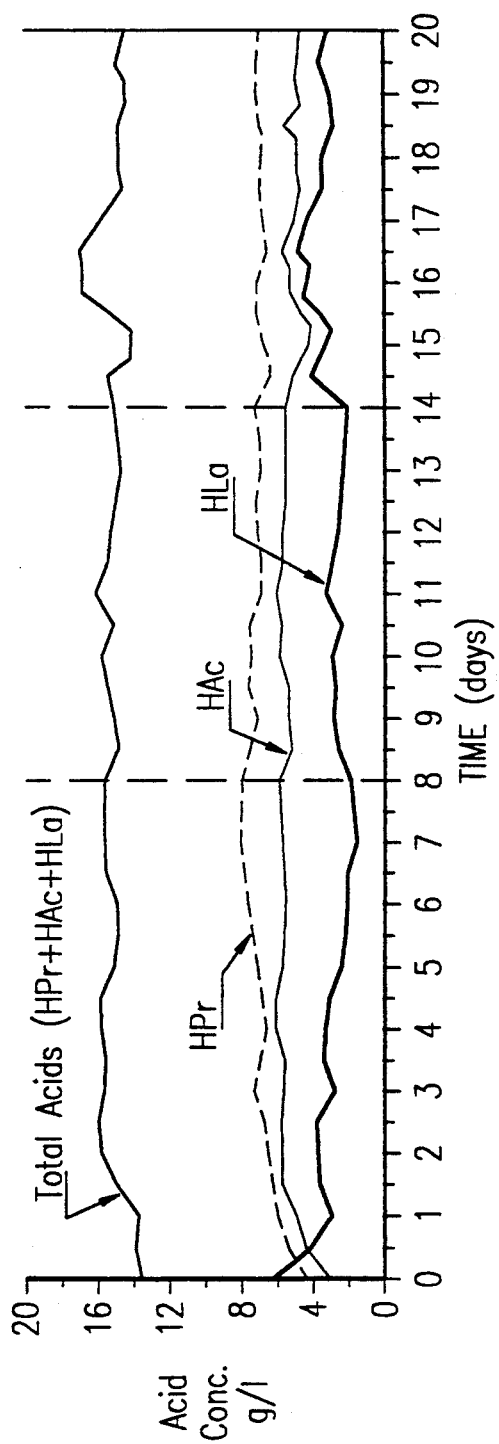
FIG. 4b is a graphical representation of organic acid production during continuous *P. acidi-propionici* fermentation with cell recycling using glucose as a sugar substrate, pH 5.5–6.3 and D of 0.036–0.1/h.

FIGS. 2a and 2b present the data generated for changes in organic acid and cell mass concentrations through time for a glucose batch fermentation at 30° C. and a pH of 6.0. All of the observed concentrations plateaued or leveled off after approximately 110 hours, which demonstrated that the culture was mature. P. acidi-propionici consumed glucose geometrically during the first twenty hours of fermentation, and this sugar was immediately converted into a high microbially derived concentration (16 g/liter) of lactic acid. The lactic acid concentration decreased over time as the concentrations of propionic and acetic acids increased. After about sixty hours of fermentation, the concentration of propionic acid always exceeded the acetic acid concentration.

In another test, xylose was used in lieu of glucose as the sugar substrate in the growth medium, under conditions that were otherwise identical to the glucose fermentation represented in FIGS. 2a and 2b. Table 1 below presents a comparison between the products of mature fermentation runs using different sugars at the same pH.

TABLE 1

Batch Fermentation at pH 6
Comparing Glucose and Xylose as Sugar Sources

| ITEM | SUGAR SOURCE | |
|---|---|---|
| | GLUCOSE | XYLOSE |
| Total Sugar (g/l) | 19.1 | 19.1 |
| Maximum Cell Mass (g/l) | 4.0 | 3.73 |
| Maximum Cell Yield (g/ cell/g sugar) | 0.21 | 0.20 |
| Acid Concentrations (g/l) | | |
| Propionic Acid | 8.52 | 5.36 |
| Acetic Acid | 5.71 | 3.80 |
| Lactic Acid | 0.25 | 0.0 |
| Total Acid Production (g/l) | 14.48 | 9.16 |
| Product Yield (g/acid/g sugar) | 0.76 | 0.48 |
| Maximum productivity (g product/h) | 0.13 | 0.15 |

EXAMPLE II

Another set of experiments implemented a process including continuous fermentation, membrane filtration, and growth medium replacement in an effort to enhance the acid productivity of the fermentation system. The individual trials monitored the effects of different sugar sources, times, filtration and medium replacement rates, as these parameters altered the concentrations of fermentation products.

Figure 3:
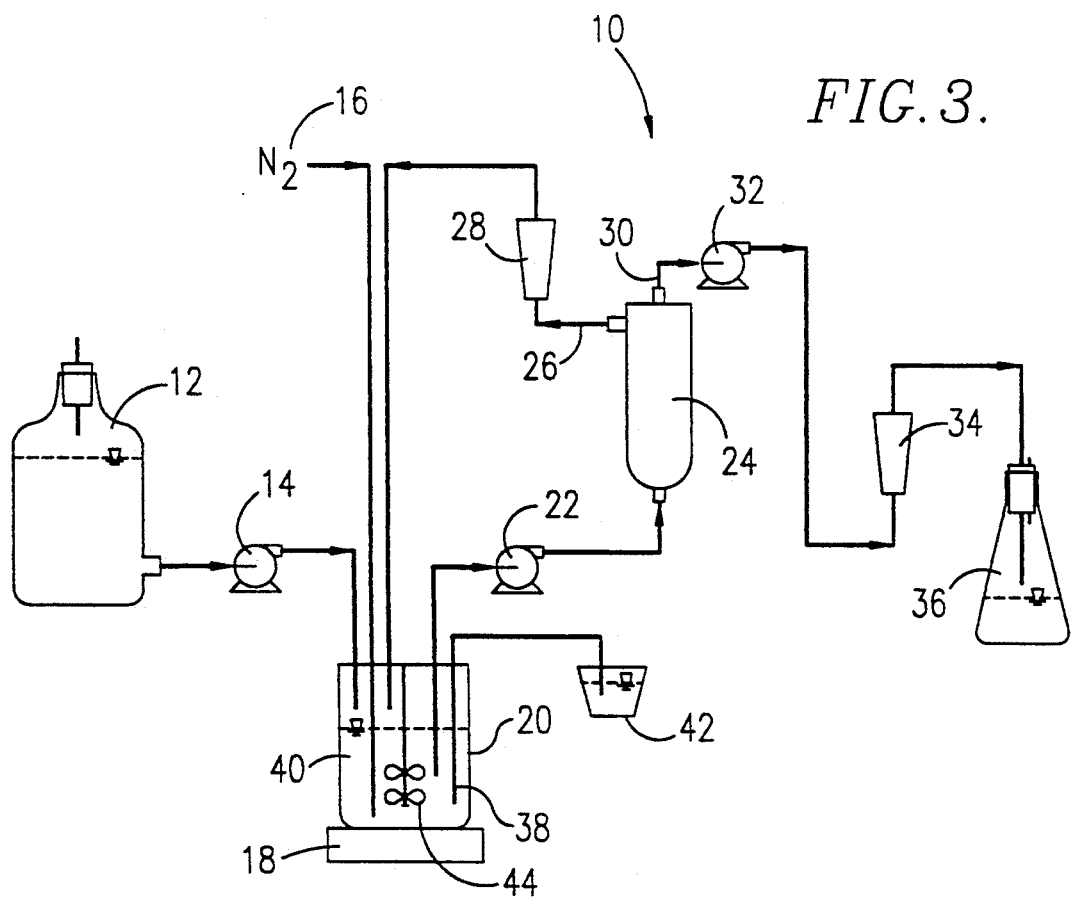
FIG. 3 is a schematic representation of laboratory-type continuous fermentation apparatus useful in the practice of the present invention.

FIG. 3 depicts apparatus 10 for the continuous fermentation, which includes feed reservoir 12, peristaltic feed pump 14, nitrogen source 16, heater stirrer 18, fermentation vessel 20, recycling pump 22, cross-flow filtration capsule 24, return flow line 26, flow meter 28, permeate flow line 30, permeate pump 32, flow meter 34, and permeate reservoir 36. These devices, as separate components, were chosen from the commercially available types of standard laboratory devices. Vessel 20 included the pH and dissolved $O_2$ electrodes as set forth in Example I. The electrodes 38 were inserted into fermentation broth 40 and operably coupled with controls 42. Controls 42 included a microprocessor pH controller configured to adjust pH by directly adding 5N sodium hydroxide or hydrochloric acid to broth 40, and a dissolved oxygen indicator module. Vessel 20 additionally included an impeller 44. Heater stirrer 18 was set for fermentation at 30° C. (within ±0.2° C.), and this device incorporated a bottom driven magnetically coupled agitation system for turning the impeller 44 at 175 rpm. Cross-flow filtration capsule 24 was an Acroflux cross-flow filter made by Gelman Sciences of Ann Arbor, Mich., which incorporated a membrane filter. Flow meters 28, 34 were Gilmont flow meters. The total fermentation volume incorporated a total of 660 ml of media including 550 ml in vessel 20 and 110 ml in capsule 24.

In the first step, a growth medium was prepared that was identical to the growth medium of Example I, except that the type of sugar was varied in different sets of fermentations. The medium was placed into feed reservoir 12 under aseptic and anoxic conditions. Pump 14 drew medium from reservoir 12 and conveyed it through tubing to fermentation vessel 20 where it was first inoculated with a single loop of P. acidi-propionici for fermentation in broth 40. Dissolved oxygen was at all times kept near zero by discharging nitrogen gas from source 16 into the bottom of vessel 20. The electrodes and controls 42 were operated to monitor and, if necessary, control pH by the addition of 5N hydrochloric acid or sodium hydroxide as in Example I, except the pH of broth 40 was allowed to vary more widely between 5.5 and 6.3. Pump 22 conveyed fermentation broth 40 to filtration capsule 24 where permeate consisting of a solution including organic acid products from broth 40 traveled through line 30, and pump 32 into reservoir 36. Line 26 discharged cells and solution from capsule 24 for recycling into vessel 20. Flow meters 28 and 34 were used to monitor the flow rates in the respective lines and this monitoring provided data that enabled adjustment of the dilution ratio in filtration as new medium replaced the filtrate departing the system.

One set of runs studied the impact of varying the rates of growth medium replacement and filtration had upon fermentation productivity over time. This study was accomplished by varying the dilution ratio D, defined as the ratio of the feed flow rate from pump 14 versus the total fermentation volume, for different periods of fixed ratio fermentation until the process reached a steady state of flow rates and cell recycling ratio. The fixed dilution ratio values varied between 0.036 and 0.23/h. The fixed ratio was checked and adjusted at intervals of 0.3 to 0.5 hours, and it was not changed to another fixed ratio until the fermentation reached a steady state at that flow rate. Temperature and recycling ratios were maintained without change for about three to four total system filtration volume cycles. Approximately 20 to 30% of the cells were bled through a sample port and replaced with fresh growth medium at the end of each fixed dilution ratio run, which procedure assured high numbers of viable cells in fermentation vessel 20.

FIGS. 4a, 4b, 6a and 6b present the plotted results for continuous glucose fermentation using a fixed dilution ratio that varied in approximate 0.04/h increments between 0.036 and 0.23/h. In all instances, a steady state of high organic acid production was achieved at good productivity within a reasonable period of time.

Sugars other than glucose were studied in the context of continuous fermentation. Acid hydrolysis of wood chips and bakery wastes (primarily stale bread) provided sugars, other than pure glucose, for the continuous fermentation process. First, these materials were separately oven dried at 65° C. for about one week. The wood chips were then ground by a roller mill, whereas the bakery wastes were ground by a hammer mill, and the corresponding particles were separated using a #20 (0.85 mm) Ro-Tap sieve. The fractions passing through the sieve were collected for use in the experiments. In order to assure that sufficient drying had occurred, the moisture contents of representative samples were determined by evaporation at 95° C. for 4 hours under a vacuum of 30 torr, in accordance with A.O.A.C. method 7.003). About 50 g of dry bakery waste was added to 450 g of 2% sulfuric acid, and 75 g of dry wood chips were added to 425 g of 2% sulfuric acid.

These slurries were hydrolyzed in an autoclave at 132° C. for 40 minutes then cooled and filtered through cheese cloth. The filtrates were neutralized with 5N sodium hydroxide, and were then filtered a second time using a Polypure capsule from Gelman Sciences, Inc. of Ann Arbor, Mich.. The final solutions were diluted to 4% total sugar content. In the preparation of the growth medium using these 4% solutions, the solution itself replaced the distilled water of the growth media in Example I, and no pure sugar was separately added. The continuous fermentations were carried out as described above, at pH 5.5–6.3, with D of 0.1/h.

Figure 5A:
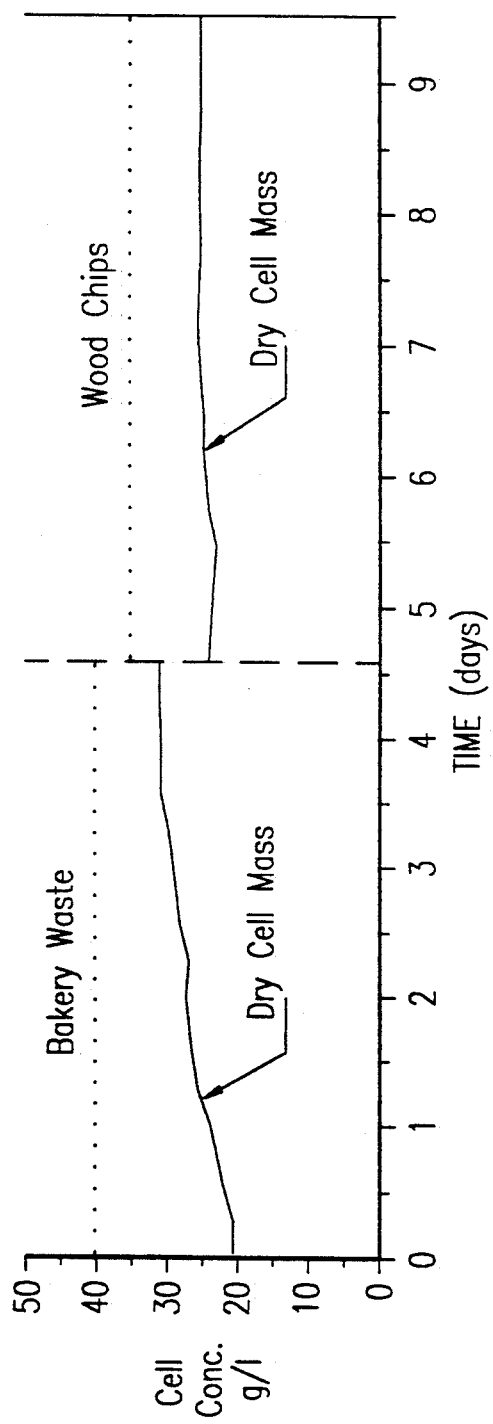
FIG. 5a is a graphical representation of cell mass production during continuous *P. acidi-propionici* fermentation with cell recycling using sugars derived from biomass hydrolysis, pH 5.5–6.3 and D of 0.1/h.
Figure 5B:
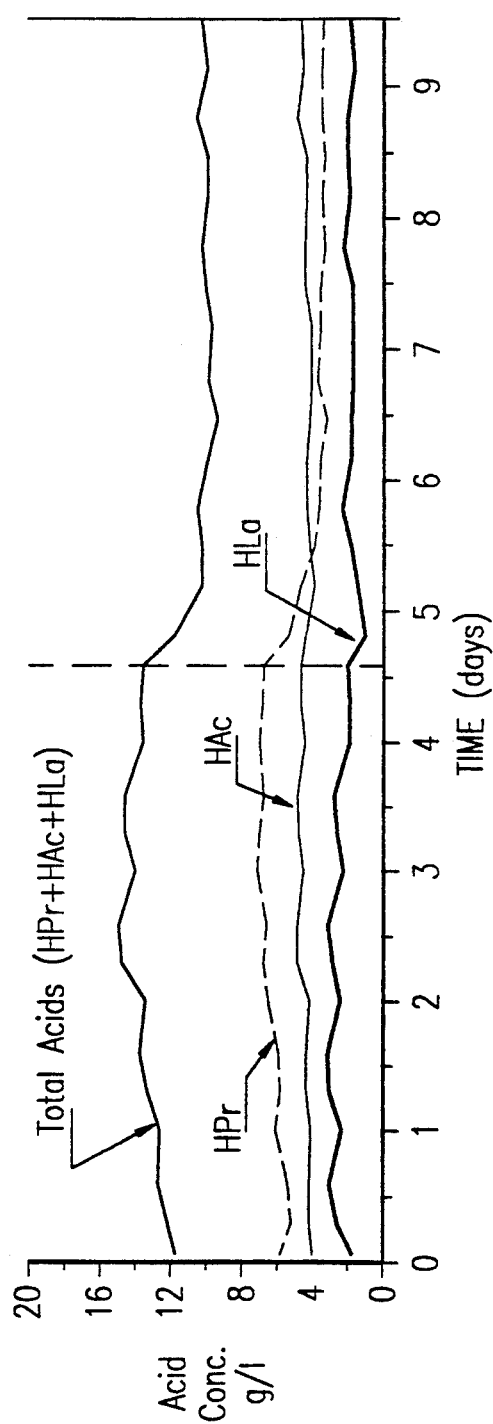
FIG. 5b is a graphical representation of organic acid production during continuous *P. acidi-propionici* fermentation with cell recycling using sugars derived from biomass hydrolysis, pH 5.5–6.3 and D of 0.1/h.
Figure 6A:
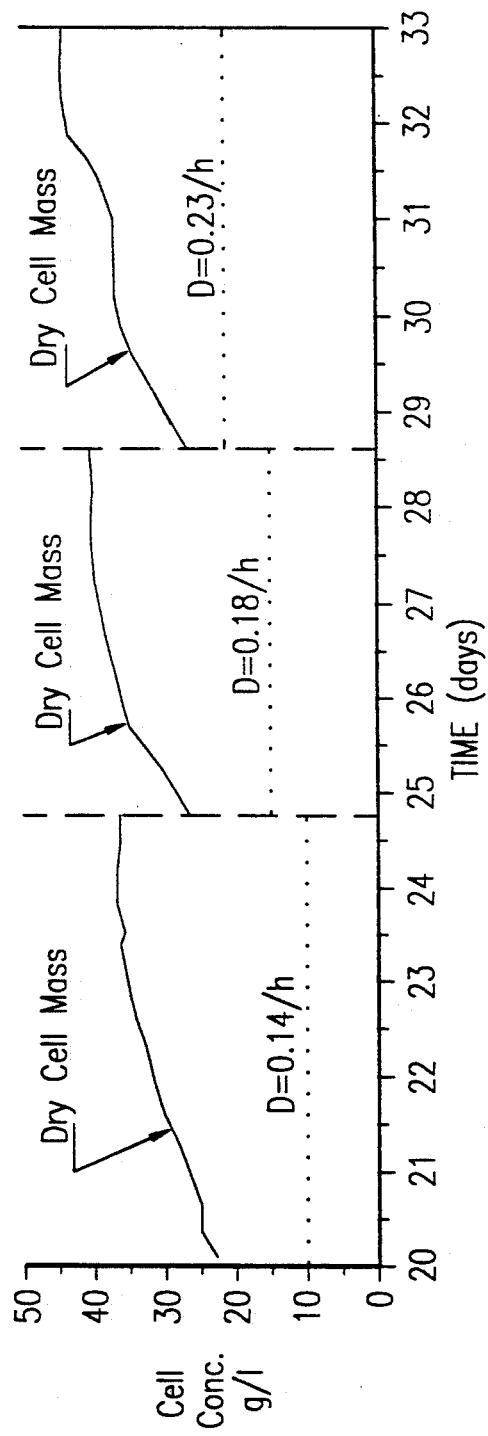
FIG. 6a is a graphical representation of cell mass production during continuous *P. acidi-propionici* fermentation with cell recycling using glucose as a sugar substrate, pH 5.5–6.3 and D of 0.14–0.23/h.
Figure 6B:
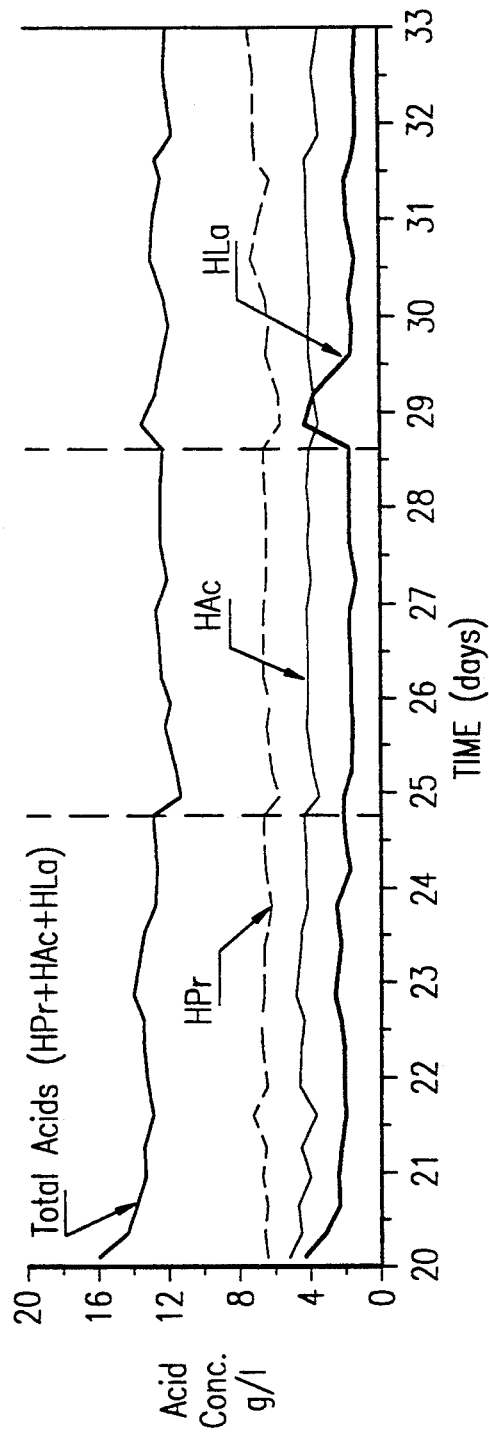
FIG. 6b is a graphical representation of organic acid production during continuous *P. acidi-propionici* fermentation with cell recycling using glucose as a sugar substrate, pH 5.5–6.3 and D of 0.14–0.23/h.

FIGS. 5a and 5b set forth the alternate sugar source results. Again, production of organic acids in good yield was found. Table 2 below sets forth the steady state fermentation results from these tests.

TABLE 2

Continuous Fermentation with Cell Recycling
Comparing Hydrolyzates of Bakery Waste and Wood Chips

| | SUGAR SOURCE | |
|---|---|---|
| ITEM | BAKERY WASTE | WOOD CHIPS |
| Total Sugar (g/l) | 18.4 | 19.6 |
| Glucose | 18.4 | 2.8 |
| Xylose | 0.0 | 16.8 |
| Final Cell Mass (g/l) | 30.84 | 25.29 |
| Cell Yield (g cell/g sugar) | 1.68 | 1.29 |
| Final Acid Concentrations in the Permeate (g/l) | | |
| Propionic Acid | 6.96 | 3.54 |
| Acetic Acid | 4.69 | 4.78 |
| Lactic Acid | 2.09 | 2.04 |
| Total Acid Production (g/l) | 13.73 | 10.36 |
| Product Yield (g acid/g sugar) | 0.75 | 0.53 |
| Maximum productivity (g product/h) | 1.37 | 1.04 |

Figure 7:
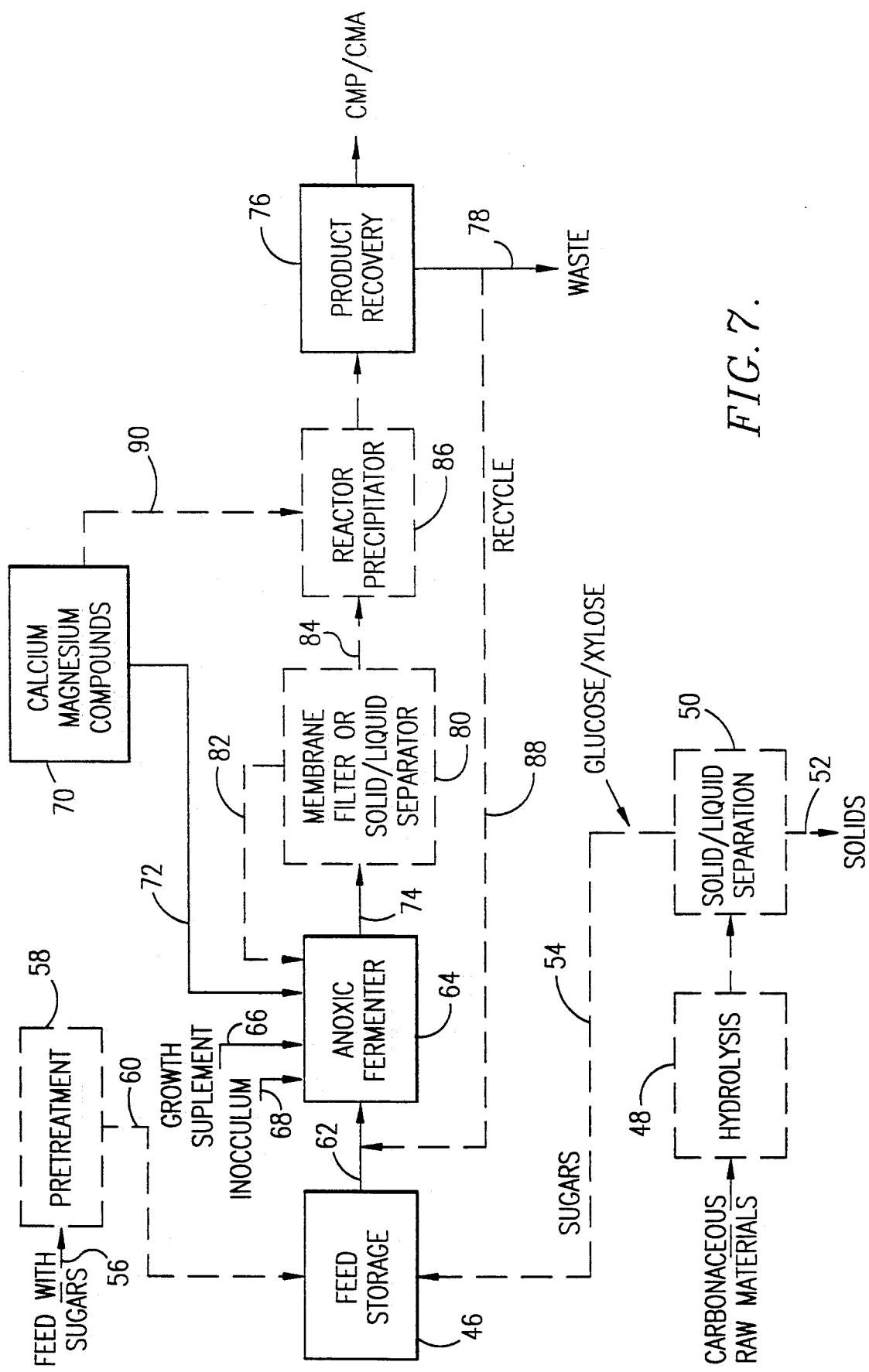
FIG. 7 is a schematic block diagram illustrating a preferred reaction scheme for the production of road deicers in accordance with the invention.

FIG. 7 illustrates a reaction scheme for the production of road deicers in accordance with the invention, where the full line blocks represent necessary steps and the dotted line block represent alternatives, particularly in the context of continuous fermentation.

In particular, the reaction scheme involves use of a feed storage tank 46 for substrate sugars such as glucose or xylose. In one alternative, carbonaceous raw materials are hydrolyzed as at 48 and subjected to a solid/liquid separation in step 50. The solids are directed for disposal through line 52, whereas the sugars are conveyed via line 54 to tank 46. In alternative procedure, a sugar-containing feed 56 may be used, with the sugars being subjected to pretreatment in vessel 58 (e.g., sterilization). These sugars are then passed via line 60 to storage tank 46.

The sugars from tank 46 pass by way of line 62 into anoxic fermenter 64. Growth supplement is directed into the fermenter 64 via line 66, as is facultative bacterial inoculum through line 68. At an appropriate time, calcium/magnesium compounds are sent from supply 70 through line 72 to the fermenter 64 for reaction with the organic acids derived from the anoxic fermentation. In the case of a batch-type fermentation, the resultant calcium magnesium salts are conveyed through line 74 to product recovery step 76. In the latter step, the salts are dried to yield the final mixed salt product, and wastes are delivered via line 78.

Where continuous fermentation is undertaken, the contents of fermenter 64 are passed through membrane filter or solid/liquid separator 80 and recycled through line 82. The output from the device 80 is directed via line 84 to a reactor/precipitator 86, which outputs to the product recovery step 76. Also as shown, a recycle line 88 extends from waste line 78 back to the fermenter 64. In addition, a line 90 extends from supply 70 to the reactor 86.

Those skilled in the art will appreciate that a number of variations can be made in the process or apparatus described herein. It is of course intended that all such alterations are included within the scope of the present invention.

EXAMPLE III

In this example, representative preparations of CMP and CMA salts are presented.

Aqueous mixtures of calcium hydroxide and magnesium hydroxide were prepared to give calcium to magnesium molar ratios of 4:6 and 3:7 in approximately 40% distilled water. The slurries were mixed with 110% of the stoichiometric requirement of either propionic or acetic acid and aged overnight for at least eight hours. The final mixture was dried in the oven at 104° C. until no more weight loss occurred (about 3 days), and ground to give an anhydrous product. Magnesium propionate was prepared in the same manner except that no calcium hydroxide was used in the slurry mixture. Table 3 lists the actual quantities of materials used.

TABLE 3

| Salt | Ca(OH)$_2$ (g) | Mg(OH)$_2$ (g) | H$_2$O (g) | Acetic Acid (g) | Propionic Acid (g) | Final Product (g) |
|---|---|---|---|---|---|---|
| CMA (4/6) | 29.64 | 34.98 | 60 | 120 | | 149 |
| CMA (3/7) | 22.23 | 40.81 | 60 | 120 | | 147 |
| CMP (4/6) | 29.64 | 34.98 | 80 | | 148 | 177 |
| CMP (3/7) | 22.23 | 40.81 | 80 | | 148 | 175 |
| MP | 58.3 | | 80 | | 148 | 170 |

I claim:

1. A road deicer product produced by a method comprising the steps of:
   providing a mixture of carboxylic acids in water comprising propionic acid and acetic acid, said propionic acid being the preponderant acid of the acid fraction of said mixture;
   reacting said mixture with a source of calcium and magnesium cations to form a reaction product including respective quantities of calcium magnesium propionate end calcium magnesium acetate, said calcium magnesium propionate being present at a level of from about 50–75% by weight, and said calcium magnesium acetate being present at a level of from about 25–40% by weight; and
   recovering said reaction product as a solid road deicer.

2. A solid road deicer composition comprising respective quantities of calcium magnesium propionate and calcium magnesium acetate, said calcium magnesium propionate being present at a level from about 50–75% by weight and said calcium magnesium acetate being present at a level of from about 25–40% by weight.

3. The composition of claim 2, said calcium magnesium propionate having a molar ratio of calcium to magnesium of from about 0.1:1 to 1:0.1.

4. The composition of claim 2, including a quantity of calcium magnesium lactate therein.

* * * * *